(12) United States Patent
Lauzon et al.

(10) Patent No.: US 6,304,649 B1
(45) Date of Patent: *Oct. 16, 2001

(54) METHOD AND SYSTEM FOR PROCESSING AN INCOMING CALL

(75) Inventors: Eric Lauzon, Mirabel; Stephane Proulx, Montreal; Nathalie Rico, Montreal; Sylvain Jodoin, Montreal, all of (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,762

(22) Filed: Dec. 19, 1997

Related U.S. Application Data

(60) Provisional application No. 60/059,505, filed on Sep. 19, 1997.

(51) Int. Cl.[7] ...................................................... H04M 3/42
(52) U.S. Cl. ........................ 379/210; 329/201; 329/215; 329/373
(58) Field of Search ................................... 379/201, 207, 379/210, 211, 212, 215, 393, 373

(56) References Cited

U.S. PATENT DOCUMENTS

| | | | | |
|---|---|---|---|---|
| 5,206,901 | * | 4/1993 | Harlow et al. | 379/211 |
| 5,454,032 | * | 9/1995 | Pinard et al. | 379/167 |
| 5,506,890 | * | 4/1996 | Gupta et al. | 379/211 |
| 5,548,636 | * | 8/1996 | Bannister et al. | 379/211 |
| 5,586,169 | * | 12/1996 | Pinard et al. | 379/211 |
| 5,636,269 | * | 6/1997 | Eisdorfer | 379/215 |
| 5,668,862 | * | 9/1997 | Bannister et al. | 379/211 |
| 5,724,411 | * | 3/1998 | Eisdorfer et al. | 379/207 |
| 5,764,748 | * | 6/1998 | Rosenthal et al. | 379/215 |
| 5,802,160 | * | 9/1998 | Kugell et al. | 379/211 |
| 5,857,017 | * | 1/1999 | Ohi et al. | 379/215 |
| 5,862,208 | * | 1/1999 | MeLampy et al. | 379/212 |

* cited by examiner

Primary Examiner—Ahmad Matar
Assistant Examiner—William J. Deane, Jr.

(57) ABSTRACT

A service is disclosed which allows subscribers who have multiple telephone lines extending from the same end office and who subscribe to such a service, to now be alerted on all of their multiple lines of an incoming call to any one of their lines. Regardless of which line in a predefined group of lines the incoming call is originally destined for, the subscriber will be alerted of the incoming call on each one of their lines. Numerous enhancements to the service are also disclosed.

27 Claims, 8 Drawing Sheets

METHOD AND SYSTEM FOR PROCESSING AN INCOMING CALL

This application claims the benefit of U.S. Provisional Application No. 60/059,505, filed on Sep. 19,1997.

FIELD OF INVENTION

This invention relates to telephony services in general and more specifically relates to telephony services for subscribers having more than one telephone line.

BACKGROUND TO THE INVENTION

As competition intensifies between service providers of telephony services, providers are looking for services which provide great value and flexibility for their subscribers. Services which increase the likelihood of a calling party reaching the person to whom they wish to contact can provide subscribers with increased flexibility and increase service provider revenues.

With recent advances in technology which now make working from home a possibility, telephone service providers are seeing an increase in subscribers requesting one or more additional and separate telephone lines to their existing residence line. These additional telephone lines and respective telephone sets are used generally to satisfy their business needs and in most cases the physical telephone set connected to this business line is in a location quite remote to any sets connected to the primary residence line or to other lines. In a work at home environment for example, it is very common and certainly desirable to be able to work in many different parts of ones house over the course of the day to take advantage of different atmospheres. A common problem however can occur when for example, when a business call comes in on the subscribers second or non business line when the subscriber happens to be in a room or even building (garage or studio) quite remote from the business telephone set. The subscriber may be unaware of the incoming call to the business line or may have problems getting to the phone before the caller drops the call.

In a similar manner and for the same reasons calls to the primary residence line or any of the other subscriber lines may be missed when the subscriber is not in the near vicinity of terminals associated with these other lines. In either case the subscriber may end up missing the call.

In existence today are telephones which can be connected to more than one line and which allow a user to switch between lines. These telephones however are generally more expensive and are not usually found throughout the home environment.

Some Service Providers today offer services to help prevent customers from missing an incoming call to one of their other lines just because they may not be physically nearby at the moment of the incoming call. For example, certain service providers today offer flexibility by providing their subscribers with a 1-500 service. The service allows a subscriber to inform a respective service provider which terminals, each of which has a unique directory number (DN), the subscriber wishes to be alerted simultaneously in response to an incoming call to the subscribers 1-500 number. A directory number is a number which has a direct association with a line appearance on a physical switch and to which a physical terminal is associated. Switch translations are capable of directly translating a DN into a line port or line appearance on a switch within a wire line or wireless network.

In the event of an incoming call to the special 1-500 number the service providers network will correspondingly alert those terminals corresponding to DNs provided by the subscriber and contained in a customer lookup table or profile. These directory numbers are generally spread throughout the public network and examples would include perhaps a subscribers residence line, his or her cottage line, their cellular line and their downtown office line. The alerted terminal which first responds by going off hook for example is connected to the calling party associated with the incoming call. Incoming calls however, to any of the individual DNs contained in the lookup table or profile rather than the special 1-500 number will however only be routed by the network to the individual terminal corresponding to that DN. Callers who wish to contact a subscriber to the 1-500 service may not be able to if they are unaware of the 1-500 number and the subscriber happens not to be in the physical location corresponding to the individual terminal being called. The 1-500 service is hardly transparent to the subscriber as it requires a separate and additional number.

Other service providers provide their subscribers with substantially the same service by providing a new separate personal telephone number and associate a customer profile to that personal number. The customer profile is used by the service providers network to assist in the routing of an incoming call to the subscribers personal number. A caller who is aware of the 'personal number' can attempt to reach the subscriber by dialing their personal telephone number and in much the same way as for the 1-500 service an incoming call to the personal number will be routed according to the subscribers profile to one or more of the subscribers terminals, each of which would have their own DN. The shortfalls of this method are substantially the same as for the 1-500 service. Numbers such as the '1-500' and the 'personal number' described herein are not considered to be directory numbers as defined in this specification.

Service providers implementing these types of services generally require additional network equipment such as adjuncts or Intelligent Peripherals (IPs) to assist in the call set-ups to the additional directory numbers found in subscriber profiles.

There is a need therefore for service providers to provide a service which minimizes the chances of subscribers missing incoming calls to their different lines having different directory numbers and without the need for requiring special telephone sets (which are capable of being connected to more than one line), no requirement for adjuncts and without requiring special numbers other than the assigned subscriber line directory numbers.

SUMMARY OF THE INVENTION

The invention seeks to overcome the above mentioned problems.

In accordance with an aspect of the invention there is provided a method of processing an incoming call to one of a plurality of lines where each line terminates on a single switch, the method comprising the steps of provisioning the plurality of lines terminating on the switch as a single group; in response to an incoming call to any one line of said group, said switch alerting said one line along with each other line of said group.

Subscribers who have multiple telephone lines extending from the same end office and who subscribe to such a service, can now be alerted on all of their multiple lines of an incoming call to any one of their lines. In other words, regardless of which line in the predefined group of lines the incoming call is originally destined for, the subscriber will be alerted of the incoming call on each one of their lines without the use of special directory numbers.

In accordance with another aspect of the invention there is provided a method of processing an incoming call to one of a plurality of lines where each line terminates on a single switch, the method comprising the steps of: provisioning the plurality of lines terminating on the switch as a single group; in response to an incoming call to any one line of said group, determining at said switch if group alerting has been provisioned against said one line; in response to group alerting being provisioned against said one line, said switch alerting said one line along with each other line of said group; and in response to group alerting not being provisioned against said one line, said switch alerting only said one line. Increased flexibility is provided to the customer of such a service where the customer has the option of provisioning group ringing on a per-line basis. The customer may wish for example not to have all lines of the group alerted in response to an incoming call to one particular line; an example might be calls to their 'TEEN' line however the customer may wish incoming calls to other lines of the group to still alert the Teen line.

Conveniently, the line to which an incoming call is directed to is alerted with an alerting signal that is distinguishable from an alerting signal applied to all other lines of the group. Applying distinguishable alerting signals to all other lines of the group informs the customer prior to answering that an incoming call is intended for a line other than the one emitting the distinguishable alerting signal.

Conveniently, where a line of the group to be alerted is busy, a regular call waiting tone is applied to the line and advantageously where the line is a line other than the line to which the incoming call is originally directed to, the call waiting tone applied is distinguishable from a regular call waiting tone. Applying distinguishable call waiting tones, informs the customer prior to answering, that the waiting call is intended for a line other than the one emitting the distinguishable call waiting tone.

Conveniently where in response to a line other than the line to which the incoming call was intended for, answering the incoming call by going to an answer state, an answering party is provided with a security check prior to routing the incoming call to the other line. Providing a security check may prevent unwanted persons (e.g. other family members) from taking for example important calls to a business line from any other lines.

Very conveniently an incoming call may be answered from any line in the group, put on hold and then routed to any other line of the group. For privacy reasons or for reasons of work efficiency calls answered on one line may be put on hold and routed to another line.

Conveniently where calls are put on hold, distinctive ringback is applied to all lines other than the line to which the intended incoming call was destined for.

In accordance with a further aspect of the invention there is provided a system for processing an incoming call to one of a plurality of lines, each line having an associated terminal and terminating on a single switch comprising means for defining the plurality of lines terminating on the switch as a single group; and means in response to an incoming call to any one line of said group, for alerting an associated terminal of said one line along with associated terminals of each other line of said group.

Advantageously the system further comprises means for alerting the associated terminal of said one line with a first alerting signal and means for alerting the associated terminals of each other line of said group with a second alerting signal which is distinguishable from the first alerting signal.

DETAILED DESCRIPTION

For the purposes of this specification a flexible service which provides flexibility to customers having multiple lines served from one end office, will be referred to as Call Pick-up-Hold-Distinctive ringing (CPHD). The preferred Call Pickup, Hold and Distinctive Ringing (CPHD) service or feature allows an incoming call directed to one of the customer lines to alert and even to be answered on another line, and to be transferred back to the intended line if desired.

Terms found throughout the specification and used to describe such a service are defined as follows:

CPHD Group—is a group consisting of two or more lines associated together for the purposes of the CPHD feature or service. The lines in the CPHD group are subtended from the same end office.

CPHD Call—is a call directed to a line which is a member of a CPHD group.

CPHD Line—is a line which is a member of a CPHD group. In the context of a CPHD call, the CPHD line can play one of two roles, the CPHD subscriber line or a CPHD associate line.

CPHD Subscriber Line—in the context of a CPHD call, this is a line to which an incoming call is originally directed to, i.e. the line associated with the Called party number of an incoming call . By definition there can only be one subscriber line for an incoming call. This line is a member of a CPHD group.

CPHD Associate Line—in the context of a CPHD call, this is a line which is a member of the same CPHD group as the CPHD subscriber line, but a line to which the incoming call is not originally directed to. Where there are more than two lines in a CPHD group, all lines other than the one CPHD subscriber line are referred to as associate lines. Associate lines can receive simultaneous-distinctive alerting (ringing, Call Waiting tone), be used to pick up the call and to put it on hold.

Subscriber Terminals—are terminals on CPHD subscriber lines.

Subscriber—an end user who is physically associated with a subscriber terminal or subscriber line. A Subscriber, for example would be an end user who answers an incoming call from a Subscriber terminal.

Associate Terminals—are terminals on CPHD associate lines.

Associate—an end user who is physically associated with an associate terminal or associate line. An Associate, for example would be an end user who answers an incoming call from an Associate terminal.

End Office—is synonymous with Same Switch.

Ringback—Type of ringing applied to a line to remind the end-user that the far-end has been left on hold. This ringing is applied when the end-user terminal is in an on hook position.

Figure 1:
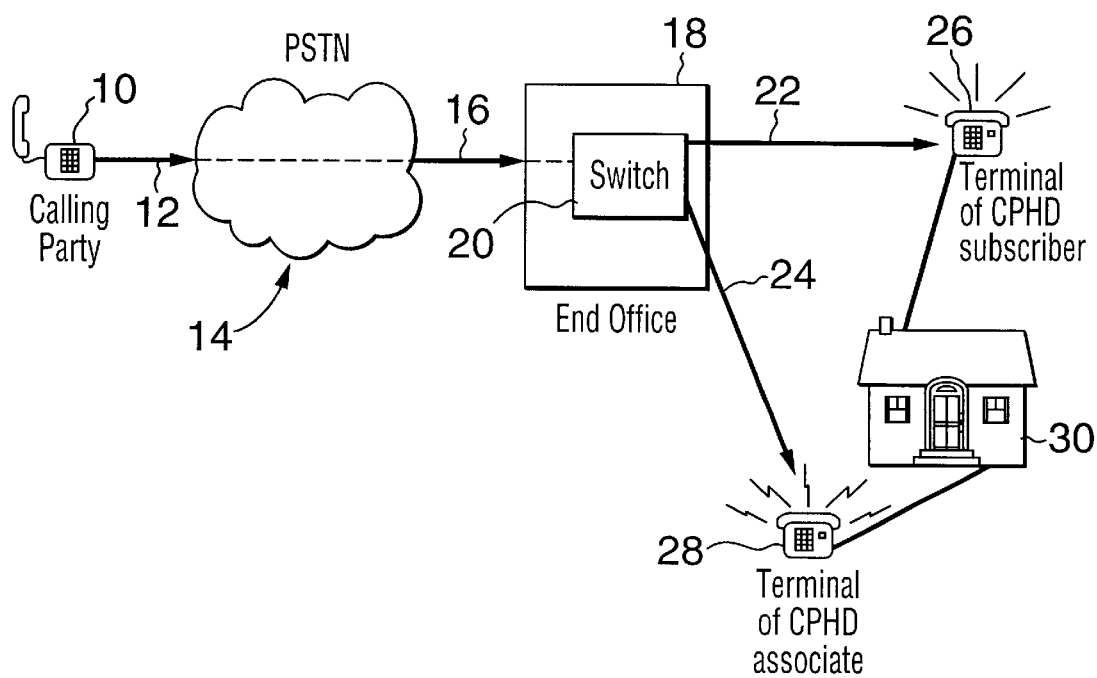
FIG. 1 illustrates one embodiment of a telephony system according to the invention.

FIG. 1 illustrates one embodiment of a telephony system according to the invention. FIG. 1 shows a calling party terminal 10 connected over a local loop 12 to a generic Public Switched Telephone Network (PSTN) 14 which in turn connects over a trunk 16 to an end office 18. The end office 18 comprises a switch 20 which in turn terminates each of customer lines 22,24 extending from the end office 18 to customer residence 30. Each of the customer lines 22,24 at the residence 30 have a respective terminal associated with each line. Terminal 26 is associated with customer line 22 and terminal 28 is associated with customer line 24. Although only two lines and associated terminals have been shown for convenience, additional lines and respective terminals can exist in practice.

In operation, switch service flow diagrams shown in FIGS. 2–7 inclusive illustrate in more detail a preferred service logic flow for implementation of the CPHD feature or service.

Figure 2:
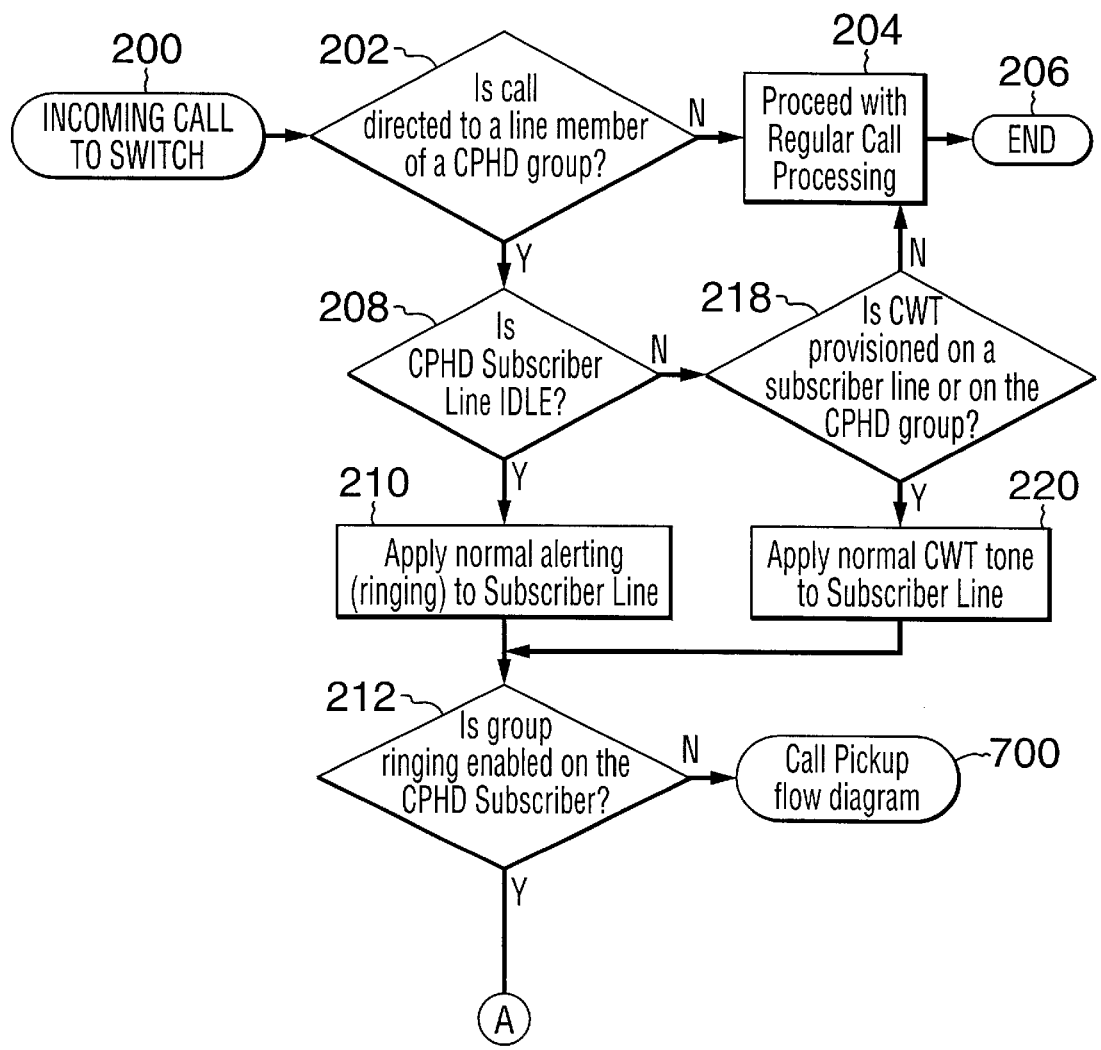
FIG. 2 illustrates a switch service flow diagram for a Simultaneous & Distinctive Alerting service for the system of FIG. 1.
Figure 2:
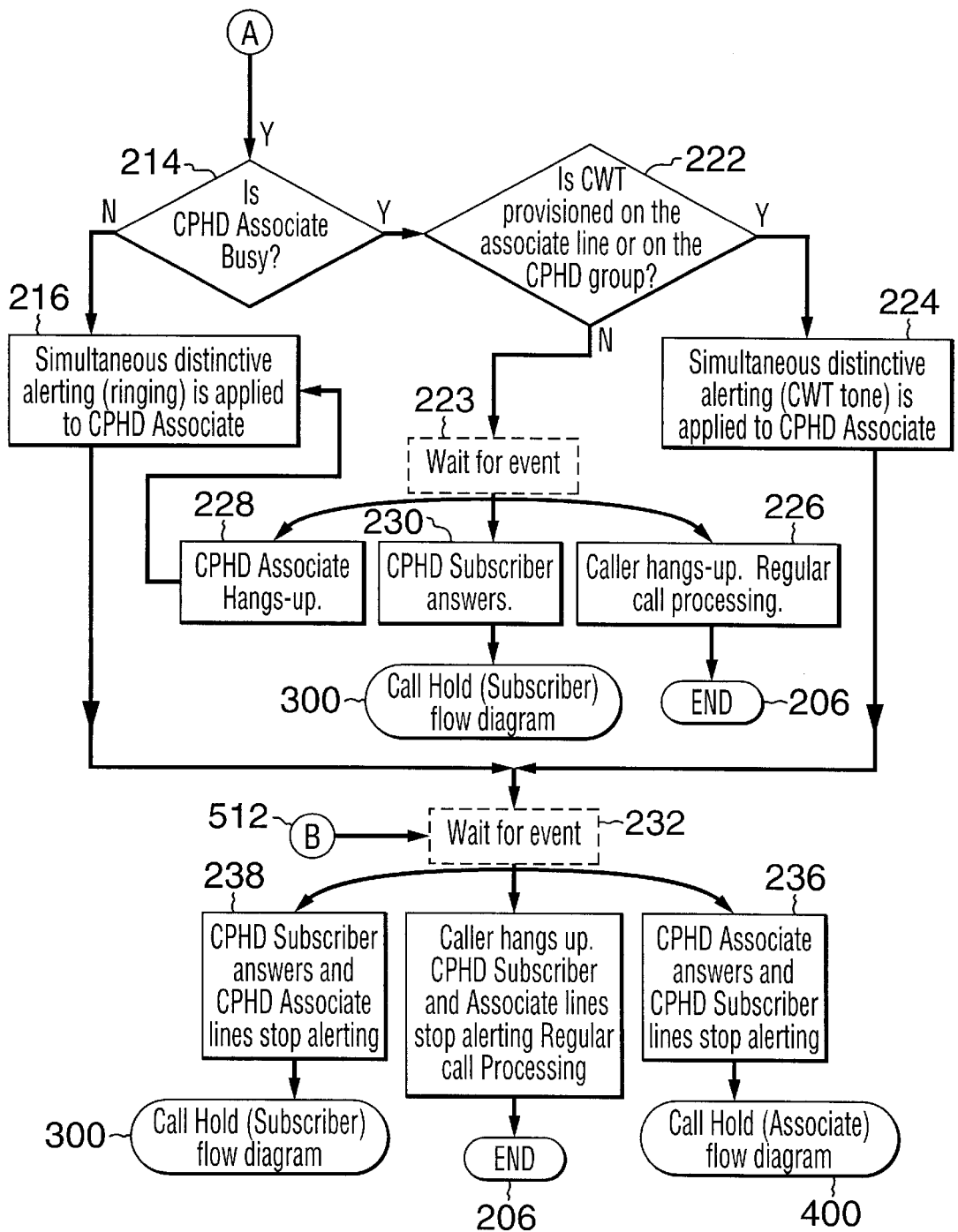

With reference to FIG. 1 and previously defined terms, customer lines 22,24 are configured in a CPHD switch provisioning table as belonging to one CPHD group. A service flow diagram shown in FIG. 2 will serve to illustrate the preferred service logic for implementing the CPHD service on a telephony switch. In FIG. 2, entry point 200 represents an incoming call to the switch 20 which terminates both customer lines 22,24 shown in FIG. 1. The CPHD service logic would be triggered during the termination portion of the call processing software and hence prior to terminating the incoming call, the service logic 202 first determines if the line to which the incoming call is directed to, is provisioned as a member of a CPHD group. If the line is not provisioned as belonging to a CPHD group the service logic 204 proceeds with regular call processing and then exits 206. If the line to which the incoming call is directed to, is provisioned as a member of a CPHD group the line is referred to as the CPHD Subscriber Line and the service logic 208 proceeds to determine if the Subscriber Line is idle. If the Subscriber Line is idle, the service logic 210 proceeds to apply normal or regular alerting in the form of a ringing signal to the Subscriber Line. Substantially simultaneously with the alerting of the Subscriber Line the service logic 212 determines if a group ringing parameter has been provisioned against the Subscriber Line. When group ringing is provisioned on the Subscriber line, simultaneous ringing is applied on all the Associate lines.

The provisioning of group ringing may be done either on a per line basis or on a Group basis. Greater flexibility is provided to the user if the provisioning is done on a per line basis and where end-users have control over the group ringing functionality of the CPHD feature from the CPHD subscriber line via for example a star access code. Dialing the predetermined CPHD star access code for ring control, from the Subscriber line would allow in known manner, the activation and deactivation of the group ringing functionality. A confirmation indication such as distinguishable tones or an announcement may be returned to the Subscriber in order to confirm the activation from the deactivation Subscriber action.

If the group ringing parameter in the preferred embodiment has not been provisioned against the Subscriber Line, the service logic 212 proceeds to enter service logic 700 for Call Pickup functionality which will be discussed in detail with reference to FIG. 7 later in this description.

If the group ringing parameter in the preferred embodiment has been provisioned against the Subscriber Line, then service logic 214 determines if the other line of the CPHD group, now referred to as the Associate line, is busy. If the Associate Line is not busy then the service logic 216 alerts the Associate Line to the incoming call and preferably does so using a distinctive alerting signal. There is a significant advantage in alerting each line differently or distinctively in that a user can tell in the case of two lines to which line the incoming call was originally intended. For example if the user picks up a line which is ringing distinctively from a regular ringing sequence then the user knows that the incoming call was directed to their other line. This would allow a user for example to distinguish between business calls and personal calls or between calls intended for ones children's line and your personal line.

In the event that CPHD subscriber line was originally not in the idle state 208, the service logic 218 determines if a Call Waiting (CWT) service has been provisioned against the Subscriber Line. If it has not been provisioned with CWT then the service logic 204 proceeds with regular call processing. If CWT has been provisioned against the Subscriber Line then the service logic 220 applies a CWT tone to the Subscriber Line and then proceeds to service logic 212. As has been described above, service logic 212 determines if a group ringing parameter has been provisioned against the Subscriber Line. If the group ringing parameter has been provisioned against the Subscriber Line, the service logic 214 determines if the Associate line is busy. If the Associate Line is found to be busy then the service logic 222 determines if CWT has been provisioned on the Associate Line and if it has then service logic 224 proceeds to apply, preferably a distinctive CWT tone to the Associate line. Applying a distinctive CWT tone to an associate line would audibly indicate to the user that the incoming call is directed to their other line (the Subscriber line) but may still be answered on the Associate line. This feature could advantageously be used by a user to effectively provide a residential overflow line. For example, a user could use another residential line to receive important calls while the main business line is busy (data call e.g. receiving a fax) while still keeping all billing and other service related support on the main business line. In a similar manner to group ringing, CWT may be provisioned either on a per line basis or on a group basis with similar advantages being applicable to per line provisioning.

If service logic 222 determines that CWT is not provisioned on the associate line the service logic enters a wait for event block 223 which waits for any of three events to occur. In the event the originating party of the incoming call 200 hangs up 226 then the service logic ends at block 206. If the Associate line hangs up 228 service logic 228 proceeds to enter service logic block 216 to proceed with distinctively alerting the Associate line. If the call is answered on the Subscriber line 230 service logic 230 proceeds to enter service logic 300 for Subscriber Call Hold functionality which will be discussed in detail with reference to FIG. 3 later in this description.

Wait for event block 232 is proceeded to either after service logic 216 applies distinctive alerting to a non busy Associate line or in the case of the Associate line being busy, service logic 224 applies a distinctive CWT tone to the Associate line. Wait for event block 232 waits for any of three events to occur. In the event the originator of the incoming call 200 hangs up 234, alerting of the Subscriber and Associate lines ceases 234 and regular call processing is invoked with the call processing ending at block 206. Where the incoming call is answered on the Associate line 236, alerting of the Subscriber line ceases and the service logic proceeds to enter service logic 400 for Associate Call Hold functionality which will be discussed in detail with reference to FIG. 4 later in this description. Where the incoming call is answered on the Subscriber line 238, alerting of the Associate line ceases and the service logic proceeds to enter service logic 300 for Subscriber Call Hold functionality which will now be discussed in detail with reference to FIG. 3 and previously defined terms.

Figure 3:
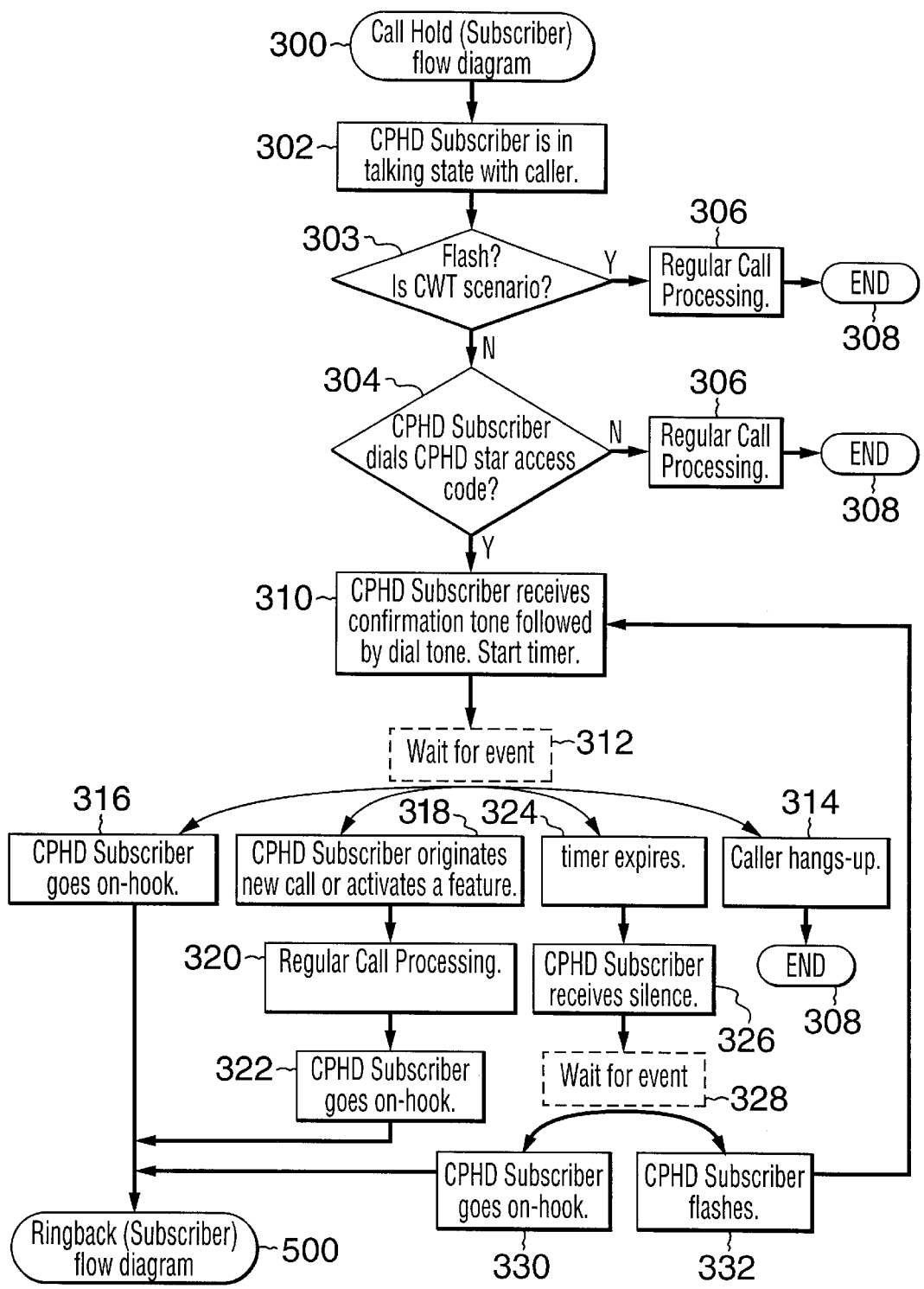
FIG. 3 illustrates a Subscriber line Call Hold flow diagram used in the service flow diagram of FIG. 2.
Figure 4:
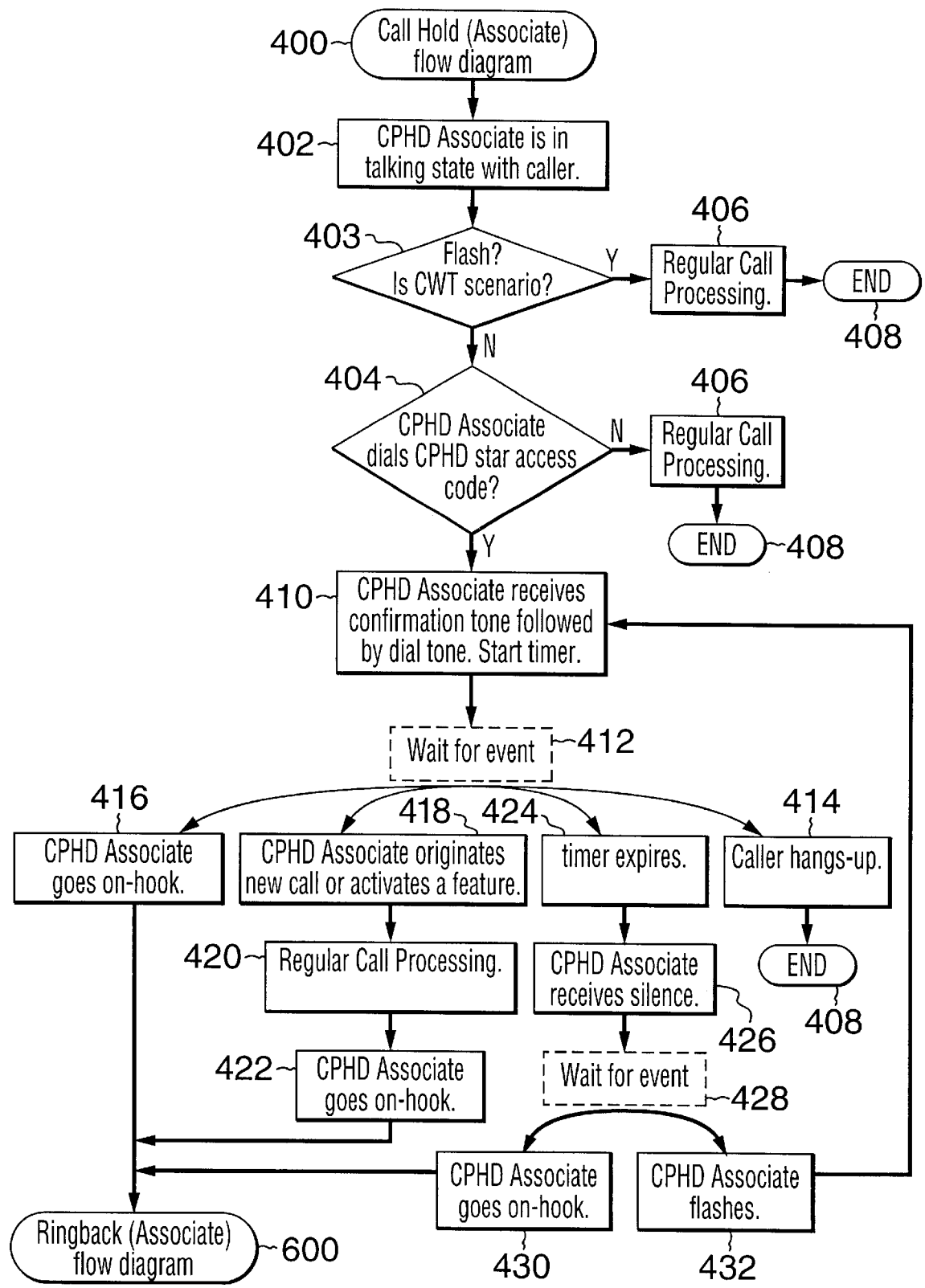
FIG. 4 illustrates an Associate line Call Hold flow diagram used in the service flow diagram of FIG. 2.

The Subscriber Call Hold service logic of FIG. 3 provides another level of functionality to a user who has answered the incoming call on the Subscriber line, i.e. at service logic block 230 or 238 (FIG. 2). As a direct consequence of the incoming call being answered on the Subscriber line, entry into the Subscriber Call Hold service logic 300 is done with the Subscriber line being in a talking state and is represented by block 302. A potential conflict arises where a Subscriber hook flash is used in block 304 to signal the switch as this indication is currently used in Call Waiting scenarios to switch between incoming calls as is known. It is expected however that subscribers will prefer to have their Call Waiting service take priority over the Call Hold functionality provided by the call flow of FIG. 3. For this reason the Call Waiting decision block 303 preceeds Service logic 303 in FIG. 3. Service logic 303 monitors the subscriber line for a hook flash indication and if the switch determines that a Call Waiting scenario exists then regular call waiting processing 306 continues until it terminates at 308. If however a hook flash is detected in the absence of a Call Waiting scenario then service logic 304 is entered with the hook flash being interpreted as the user of the Subscriber line terminal wishing to put the call on hold. If service logic 304 detects a service specific access code, the absence of which within a predetermined time leads to regular call processing 306, 308, the switch then starts a switch timer as well as sends an audible confirmation tone to the subscriber followed by dial tone 310. Service logic then waits for one of four events to occur as indicated by wait for event block 312. If the Calling party drops the call by hanging up 314, then call processing ends 308. If the Subscriber terminal goes on hook 316 the service logic proceeds to enter Subscriber Ring Back functionality 500 which will be discussed in detail with reference to FIG. 5 later in this description. If the Subscriber originates a new call or activates a feature prior to the switch timer timing out, regular call processing in accordance with the Subscriber action follows 320. In response to the Subscriber then going on hook 322 further functionality is provided upon entering Subscriber Ring Back functionality 500. If the switch timer invoked in 310 times out 324, prior to any of the events above occurring, while the Subscriber line remains idle or silent 326, the switch monitors and waits 328 for either of two events to occur. If the Subscriber terminal goes on hook 330 the service logic proceeds to enter Subscriber Ring Back functionality 500 which will be discussed in detail with reference to FIG. 5 later in this description. If the Subscriber initiates a hook flash 332 the service logic returns to block 310 which provides the Subscriber a predetermined number of seconds of dial-tone in order to originate a new call or activate a feature.

Where the incoming call is answered on the Associate line 236 (FIG. 2), alerting of the Subscriber line ceases 236 and the call processing proceeds to enter service logic for Associate Call Hold functionality 400. The Associate Call Hold service logic of FIG. 4 provides the same functionality to the Associate as the Subscriber Call Hold service logic of FIG. 3 provides to the Subscriber. The description of the Associate Call Hold service logic of FIG. 4 therefore follows directly from the Subscriber Call Hold service logic just described (substituting 'Associate' for 'Subscriber') and hence need not be repeated here. Elements found in FIG. 4, correspond directly to those elements of FIG. 3 which differ exactly by a difference of one hundred, e.g. element 402 corresponds to element 302, 404 to 304, 410 to 310 etc.

Figure 5:
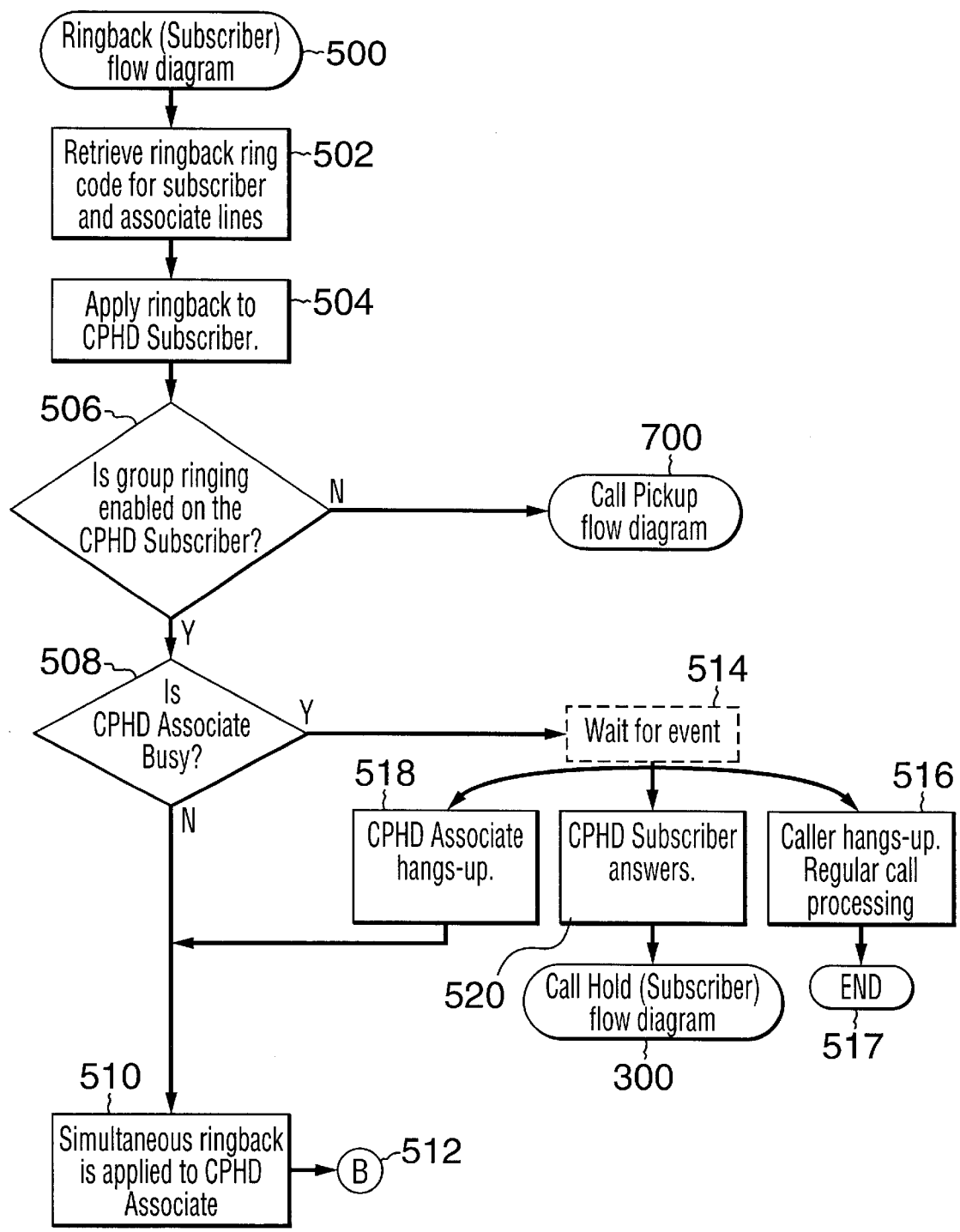
FIG. 5 illustrates a Subscriber line RingBack flow diagram used in the service flow diagram of FIG. 2.

The Subscriber RingBack service logic 500 of FIG. 5 provides a further level of functionality to a Subscriber who has answered and put on hold, the incoming call and who subsequently goes on hook, i.e. at service logic block 316 or 322, or 330 (FIG. 3). Once the Subscriber has gone on hook a lookup is done to determine and retrieve the ringback ring code or type for the Subscriber line and the Associate line(s). They may in practice be different so as to be distinctive from the original ringing pattern in a similar manner to the group ringing, with a similar advantage that when ringback is occurring a user is reminded that the incoming call which is now on hold, was or was not originally intended for the particular line that the user may be currently at. In accordance with the retrieved subscriber ringback code, ringback is applied to the Subscriber line 504. If the group ringing parameter previously described with reference to FIG. 2, has been provisioned against the Subscriber line 506 either on a per line basis or on a group basis and if the Associate line is currently not busy 508, then appropriate ringback is applied to the Associate line 510 and the call processing returns at 'B' 512 to the wait for event block 232 of FIG. 2. If group ringing has not be provisioned 506, the associate line will not receive any ringback and the service logic proceeds to enter service logic for Call Pickup functionality 700. The incoming call may however still be answered on the Associate line. If the Associate line is currently busy 508 then the service logic proceeds to Wait for Event block 514. If the originator of the incoming call drops the call by hanging up 516, regular call processing is invoked and the call ends at 517. If the Associate line becomes free as a result of the Associate hanging up 518, ringback is then applied to the Associate line 510. If the call is answered on the Subscriber line 520, while the Associate line is still busy 520 the service logic proceeds to enter the Subscriber Hold functionality 300 which has been described with reference to FIG. 3.

Figure 6:
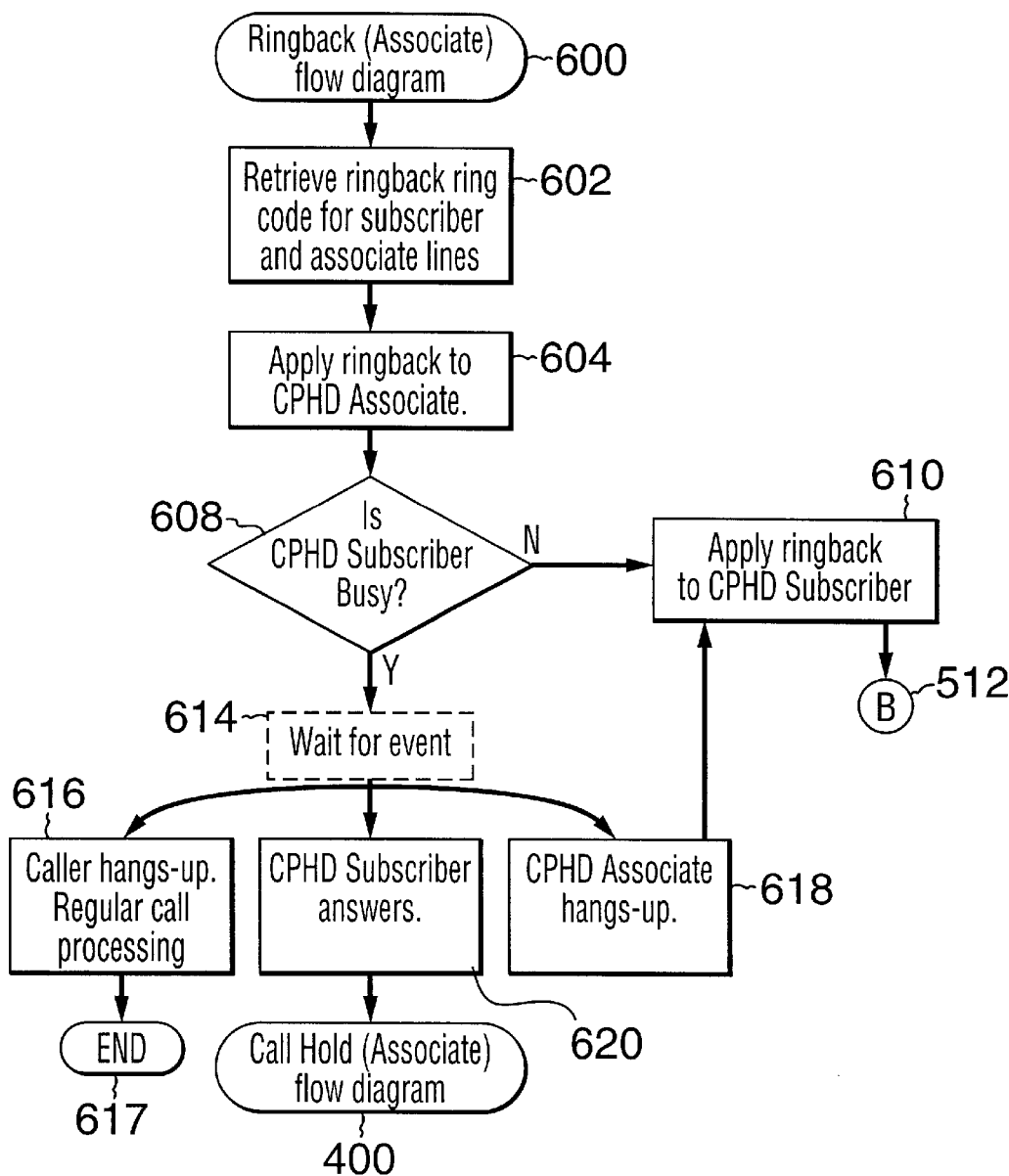
FIG. 6 illustrates a Associate line RingBack flow diagram used in the service flow diagram of FIG. 2.

The Associate RingBack service logic 600 of FIG. 6 provides a further level of functionality to an Associate who has answered the incoming call on the Associate line and who subsequently goes on hook. The description of the Associate RingBack service logic of FIG. 6 therefore follows directly from the Subscriber RingBack service logic just described (substituting 'Associate' for 'Subscriber') and hence need not be repeated here. Elements found in FIG. 6, correspond directly to those elements of FIG. 5 which differ exactly by a difference of one hundred, e.g. element 602 corresponds to element 502, 604 to 504, 610 to 510 etc. It is important to notice that in the Associate RingBack service logic, group ringing provisioning is not checked as it was in FIG. 5 (506 of FIG. 5). In the preferred embodiment the service philosophy is that users of such a service would always want the subscriber line alerted (ringback) as this is the line to which the incoming call was originally directed to. However it to be understood that this functionality, like early functionality may implemented in anyway which meets the requirements of the end user. The RingBack logic of FIGS. 5 & 6 could be extended to support Call Waiting functionality whenever the Subscriber or the Associate line is busy in a RingBack scenario (508,608) in a similar manner as was done in FIG. 2 (214, 222, 224).

Figure 7:
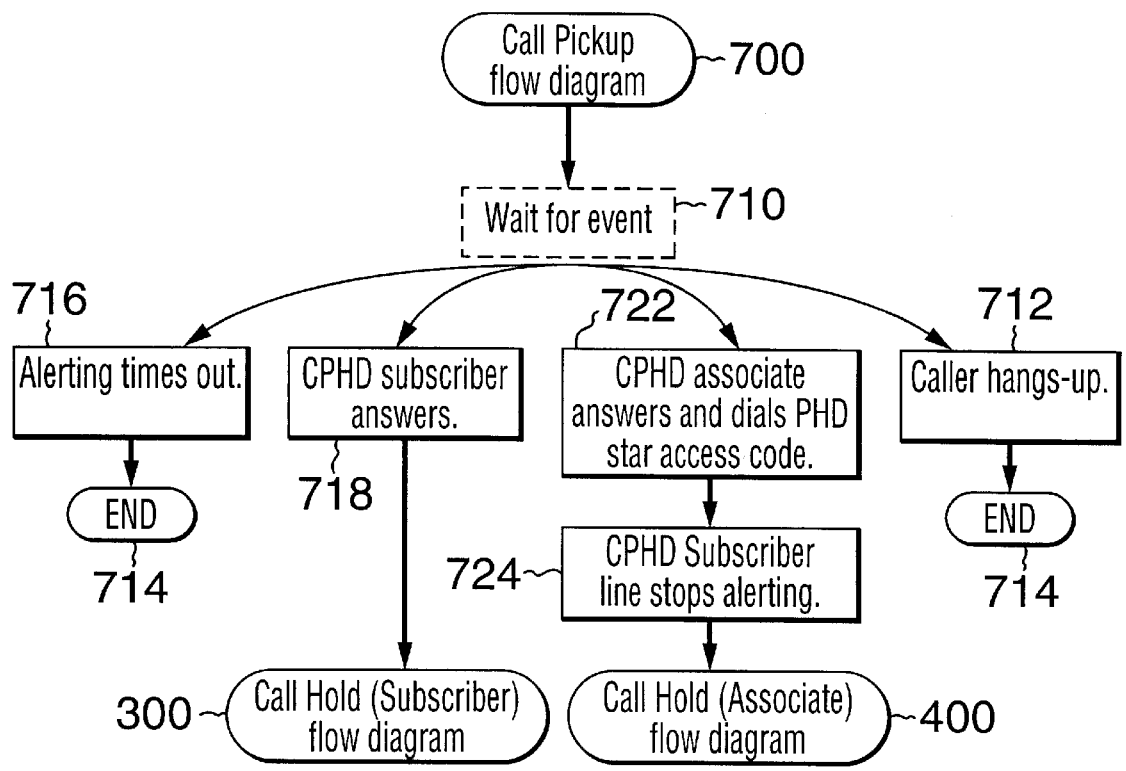
FIG. 7 illustrates a Call Pickup flow diagram used in the service flow diagram of FIG. 2.

The Call Pickup service logic 700 of FIG. 7 is entered when the Subscriber line is being alerted and where group ringing has not been provisioned (212 of FIG. 2 or 506 of FIG. 5). Types of alerting may for example be normal ringing (210 of FIG. 2) if the Subscriber line is idle, call waiting tones (220 of FIG. 2) if the Subscriber line is busy or ringback (504 of FIG. 5.) if the Subscriber line is on hold. Upon entry into the Call Pickup service logic 700 the service logic enters a Wait for event block 710. If the originator of the incoming call hangs up 712 the call processing ends at 714. End offices generally will not alert a line indefinitely and hence if alerting exceeds a predetermined time limit 716 then call processing ends at 714. If however the Subscriber responds to any of the alerting types by answering (going off hook) 718, entry into the Subscriber Call Hold service logic 300 follows to provide functionality as was already described with reference to FIG. 3. In the event that the Associate goes off hook and then enters a service specific access code 722, alerting of the Subscriber line stops 724 followed by entry into the Associate Call Hold service logic 400 already described with reference to FIG. 4.

Service Enhancements

The CPHD service may be made more user friendly by creatively and in a new way, taking advantage of existing services to single lines such as Calling Number Delivery (CND), Dialable Directory Number (DDN) and Calling Name Delivery (CNAMD). When an incoming call for example is directed to a Subscriber line, the calling party's name and/or number is delivered to the Subscriber line terminal in known manner if the line subscribes to the CNAMD and CND/DDN features. Where group ringing is provisioned, simultaneous ringing is applied to the Associate line and the calling party's name/number is also delivered to the Associate terminal. Currently for an incoming call, the switch extracts from network signaling messages (CCS7) for that call, the calling party information and the Called number (which is the Subscriber line directory number). The extracted information is then sent to the Called party which for this service would be the Subscriber to permit the Subscriber to see who is calling them. The enhancement includes an additional step of delivering the extracted information to all Associate lines. The calling party information would be displayed on the Associate Terminal and could be sent at the time distinctive alerting is applied to the Associate line(s).

An extremely valuable variation would allow end users to customize the information to be sent for displaying. A switch table would be configured by the end user of this service to contain a role designation for each line of the group. The role designation could be a predefined text string and would be sent at the time of alerting to visually help the user to determine to which line the incoming call was originally intended for. For example any incoming calls to a users business line could result in a 'Business Line' text string sent to the Associate line for display on the Associate terminal; any incoming calls to a users Personal line could result in a 'Personal Line' text string sent for display on the Associate terminal; any incoming calls to a users children's or Teen line could result in a in a 'Teen Line' text string sent to the Associate line for display on the Associate terminal. The text string could just as easily be sent to the Subscriber line. This customizing is especially valuable when a user has more than two lines.

Distinctive alerting could advantageously extend to each associate line (when more than 1) to include different alerting signals. For example each member of a CPHD group could have its own distinctive ringing code which corresponds to a unique ringing sequence. If an incoming call is intended for line 3 for example of a group, then line 3 would become the Subscriber line and be alerted with regular ringing and each other line of the group, i.e. all associate lines of the group would be alerted using line 3 distinctive ringing sequence.

Further flexibility and value can be provided to an end user whenever a call is put on hold, either from the Subscriber line or from the Associate line. The terminal display of the CPHD line on which the call was put on hold from is updated with the calling party's name and/or number upon ringback if the line subscribes to the CNAMD and CND/DDN features. Still further value is provided when simultaneous ringback is applied to the other CPHD line, by the switch also updating the terminal display of that other line, with the calling party's name and/or number (if the line subscribes to the CNAMD and CND/DDN features).

A valuable enhancement can be added by providing a degree of security to those incoming calls which are taken on lines other than the line the incoming call was originally intended for, i.e. incoming calls which are answered on Associate lines. A user of this service may desire for example that only authorized users be able to take an incoming call intended for their main business line, and answer it on one of their other lines (an Associate line). Security could be provided by a switch interface requiring the user on the Associate line to enter a predetermined star access code followed by a security code (e.g. a personal identification number). Upon verification of the security code the incoming call will be routed to the Associate line. This security requirement could also be extended prior to retrieving calls which have been put on hold from Associate lines.

General Compatibility With Existing Network Services

Automatic Recall Service (AR)

Automatic Recall Service is an existing service (currently accessed through *69) which provides to the end user the last calling party directory number to call the end users directory number. For compatibility with existing AR services, the Incoming Call Memory (ICM) of the CPHD subscriber line is updated with the directory number of the originator of the CPHD call even if the call is answered from one of the Associate lines. This would prevent loss of valuable information about calling parties to the Subscriber Line even when the incoming call is answered on an Associate line. The ICM of the CPHD Associate line is left unchanged even when simultaneous ringing is activated. Activating AR from the CPHD associate line would not recall the originator of the last CPHD call.

For billing purposes the billing would be based on the Subscriber Line. The Billing records (AMA) would contain the original called number (i.e. the DN associated with the Subscriber Line) and not the Associate line DN even when the call is answered on an Associate Line. The elapsed time of billing records associated with a CPHD call would likely include the elapsed time for which a call was left on hold by the end-user.

Termination on a Secondary DN (SDN)

When a primary DN is provisioned with the CPHD feature and a call terminates on an SDN which is provisioned to deny PHD, simultaneous ringing is not applied on the CPHD associate line. Distinctive ringing is applied to the CPHD subscriber line according to the ring code provisioned against the SDN. Although the CPHD simultaneous ringing functionality is deactivated, the call hold and call pickup functionality's are still applicable.

Numerous modifications, variations and adaptations may be made to the particular embodiments of the invention described herein without darting from the scope of the invention defined by the claims.

What is claimed is:

1. A method of processing an incoming call without the use of special directory number to one of a plurality of lines where each line terminates on a single switch, the method comprising the steps of:
   (a) provisioning the plurality of lines terminating on the switch as a single group;
   (b) in response to an incoming call to any one line of said group, determining at said switch if group alerting has been provisioned against said one line;
   (c) in response to group alerting being provisioned against said one line, said switch alerting said one line along with each other line of said group; and said step (c) comprising the steps of:
      (i) alerting said one line with a first alerting signal and alerting each other line of said group with a second alerting signal which is distinguishable from the first alerting signal;
      (ii) determining that at least one of the lines is busy and subsequently applying a call waiting indication to said busy line; and
      (iii) determining that said busy line is a line other than said one line and applying a distinctive call waiting indication to said busy line;
   (d) in response to group alerting not being provisioned against said one line, said switch alerting only said one line.

2. A method as claimed in claim 1 where group alerting is determined not to be provisioned against said one line and in response to a line other than said one line answering the incoming call by going to an answer state, the method further comprising the step of receiving at said switch over said other line, keyed entries corresponding to a feature access code and subsequently routing the incoming call to said other line.

3. A method as claimed in claim 1 wherein the second alerting signal is made distinguishable from the first alerting signal by applying a different ringing sequence to respective lines.

4. A method as claimed in claim 3 wherein the step of alerting comprises applying a regular ringing sequence as said first alerting signal and a non regular ringing sequence as said second alerting signal.

5. A method as claimed in claim 1 further comprising the step of routing the incoming call to the alerted line which first goes off hook.

6. A method as claimed in claim 1 wherein the step of alerting includes alerting substantially simultaneously the terminals of all lines in said group.

7. A method as claimed in claim 1 further comprising, in response to a line other than said one line answering the incoming call by going to an answer state, the step of providing to an answering party over said other line a security check prior to routing the incoming call to said other line.

8. A method as claimed in claim 7 wherein the security check comprises the step of comparing a sequence of received keyed entries over said other line with a stored sequence of entries.

9. A method as claimed in claim 8 wherein the keyed entries are all digits.

10. A method as claimed in claim 8 wherein the keyed entries are a combination of a feature access symbol and digits.

11. A method as claimed in claim 1 wherein in response to any one line answering the incoming call by going to an answer state the method further comprising the step of putting said incoming call on hold in response to, receiving at said switch over said any one line, a signal indicating to said switch to place said incoming call on hold.

12. A method as claimed in claim 11 wherein said received signal indicating to said switch to place said incoming call on hold is a switch-hook-flash.

13. A method as claimed in claim 11 further comprising the step of routing the incoming call to a line of said group other than said anyone line, in response to said line going to an off hook state and receiving over said line a predetermined sequence of keyed entries.

14. A method as claimed in claim 13 wherein the received sequence of keyed entries comprises a combination of a feature access symbol and digits.

15. A method as claimed in claim 1 further comprising the step of applying a distinctive call waiting indication to said busy line in response to determining that call waiting is provisioned against said busy line.

16. A method as claimed in claim 1 including the step of when alerting said one line and each other line of said group said switch also sending display information to said each other line of said group.

17. A method as claimed in claim 16 wherein the step of sending display information includes calling party information associated with the incoming call.

18. A method as claimed in claim 16 wherein the display information is a text string defining a role designation associated with said one line.

19. A method as claimed in claim 1 further comprising the steps of defining for each line of the group a different ringing sequence and alerting said one line with a regular ringing sequence and alerting each other line of said group with the ringing sequence defined for said one line.

20. A method as claimed in claim 11 where in response to said switch receiving the hold signal over any line of said group other than said one line, the switch putting the incoming call on hold and subsequently applying ringback to said any line.

21. A method as claimed in claim 20 further comprising the step of said switch also sending display information to said each other line of said group.

22. A method as claimed in claim 21 wherein the step of sending display information includes calling party information associated with the incoming call.

23. A system for processing an incoming call without the use of special directory number to one of a plurality of lines, each line having an associated terminal and terminating on a single switch comprising:
   (a) means for defining the plurality of lines terminating on the switch as a single group; and
   (b) means in response to an incoming call to any one line of said group, for alerting an associated terminal of said one line along with associated terminals of each other line of said group;
   (c) means for alerting the associated terminal of said one line with a first alerting signal and alerting the associated terminals of each other line of said group with a second alerting signal which is distinguishable from the first alerting signal;
   (d) means for determining that at least one of the lines is busy and applying a call waiting indication to said busy line; and (e) means for determining that said busy line is a line other than said one line and applying a distinctive call waiting indication to said busy line.

24. A system as claimed in claim 23 further comprising means for routing the incoming call to the line which first goes off hook.

25. A system as claimed in claim 23 including means for sending display information to said each other line of said group when alerting said one line and each other line.

26. A system as claimed in claim 25 wherein the display information includes calling party information associated with the incoming call.

27. A system as claimed in claim 25 wherein the display information is a text string defining a role designation associated with said one line.

* * * * *